United States Patent
Root et al.

(10) Patent No.: US 9,819,633 B2
(45) Date of Patent: Nov. 14, 2017

(54) SYSTEMS AND METHODS FOR CATEGORIZING MESSAGES

(71) Applicant: Social Compass, LLC, Dallas, TX (US)

(72) Inventors: Adam Matthew Root, Dallas, TX (US); Juan Francisco Leal, Irving, TX (US); Wesley James Robinson, Dallas, TX (US); Hal Patrick Helms, Dallas, TX (US); Coral Adelaide Herman, Dallas, TX (US); Hal Bryant Helms, Lewisville, TX (US)

(73) Assignee: Social Compass, LLC, Boulder, CO (US)

( * ) Notice: Subject to any disclaimer, the term of this patent is extended or adjusted under 35 U.S.C. 154(b) by 85 days.

(21) Appl. No.: 14/743,766

(22) Filed: Jun. 18, 2015

(65) Prior Publication Data
US 2015/0372963 A1    Dec. 24, 2015

Related U.S. Application Data

(60) Provisional application No. 61/998,091, filed on Jun. 18, 2014.

(51) Int. Cl.
*G06F 15/16* (2006.01)
*H04L 12/58* (2006.01)
(Continued)

(52) U.S. Cl.
CPC ............. *H04L 51/32* (2013.01); *G06Q 30/00* (2013.01); *H04L 51/22* (2013.01); *G06N 7/005* (2013.01)

(58) Field of Classification Search
CPC ......... G06F 17/30864; G06F 17/30867; G06F 17/3001; G06F 17/30554; G06F 17/30274;
(Continued)

(56) References Cited

U.S. PATENT DOCUMENTS 6,044,376 A * 3/2000 Kurtzman, II .... G06F 17/30867
6,651,057 B1 * 11/2003 Jin .................... G06F 17/30675
(Continued)

OTHER PUBLICATIONS

Ikonomakis, et al. "Text Classification Using Machine Learning Techniques," WSEAS Transactions on Computers, Issue 8, vol. 4, Aug. 2005, pp. 966-974.
(Continued)

*Primary Examiner* — Peling Shaw
(74) *Attorney, Agent, or Firm* — Holland & Hart LLP

(57) ABSTRACT

Systems and methods of the present disclosure are directed to categorizing messages. A first server can receive, from a second server maintaining a plurality of social media messages, a message. The first server can categorize the message under a first category or a second category. The first server can process the message and determine a frequency of each of the words included in the processed message. The first server determines, using a probabilistic engine executing on the first server, a relevancy score of the modified message indicating a level of relevance between the message and the first category based on the determined frequency of each of the words. The first server, responsive to determining that the relevancy score satisfies a threshold, can categorize the message under the first category.

20 Claims, 10 Drawing Sheets

(51) Int. Cl.
*G06Q 30/00* (2012.01)
*G06N 7/00* (2006.01)

(58) Field of Classification Search
CPC ...... G06F 3/048; G06Q 30/026; G06Q 30/02; G06Q 30/0271; G06Q 50/01
See application file for complete search history.

(56) References Cited

U.S. PATENT DOCUMENTS

| | | | |
|---|---|---|---|
| 7,567,958 B1 * | 7/2009 | Alspector | G06F 17/30867 |
| 9,135,641 B2 * | 9/2015 | Macadaan | |
| 2003/0023972 A1 * | 1/2003 | Gutta | H04N 7/163 |
| | | | 725/34 |
| 2011/0225368 A1 * | 9/2011 | Burge, III | G06F 12/0862 |
| | | | 711/118 |
| 2011/0289025 A1 * | 11/2011 | Yan | G06N 99/005 |
| | | | 706/12 |
| 2012/0221496 A1 * | 8/2012 | Goyal | G06F 17/30705 |
| | | | 706/12 |
| 2012/0245996 A1 * | 9/2012 | Mendez | G06Q 30/0241 |
| | | | 705/14.49 |
| 2014/0108388 A1 * | 4/2014 | Ma | G06F 17/30867 |
| | | | 707/723 |
| 2015/0286718 A1 * | 10/2015 | Wang | G06F 17/30796 |
| | | | 707/738 |
| 2016/0085848 A1 * | 3/2016 | Kogan | G06F 17/30707 |
| | | | 707/738 |

OTHER PUBLICATIONS

International Search Report and Written Opinion for PCT/US2015/036492 dated Sep. 7, 2015.

* cited by examiner

| User Input | Probability |
|---|---|
| 0 | 25% |
| 26 | 30% |
| 40 | 45% |
| 60 | 60% |
| 120 | 65% |
| 180 | 70% |
| 280 | 80% |

Fig. 4

SYSTEMS AND METHODS FOR CATEGORIZING MESSAGES

RELATED APPLICATION

The present application claims the benefit of U.S. Provisional Patent Application No. 61/998,091, entitled "Machine Learning Systems and Processing" and filed on Jun. 18, 2014, the disclosure of which is incorporated herein by reference in their entirety.

FIELD OF THE DISCLOSURE

The present solution is generally directed to machines configured to learn to categorize messages. In particular, the present solution is directed to methods and systems for categorizing messages using machine learning algorithms.

BACKGROUND OF THE DISCLOSURE

Computing resources have become more affordable and pervasive over time. At the same time, the amount of data processed and maintained by servers has also significantly increased. This mix of accessible computing resources and voluminous amounts of data has spurred the growth of data analytics. In order to analyze data, data needs to be categorized and processed to allow trends to be extrapolated from the data.

BRIEF SUMMARY OF THE DISCLOSURE

At least one aspect of the present solution is directed to a method of categorizing messages. The method can be performed or executed by a first server having one or more processors. The first server can receive, from a second server maintaining a plurality of social media messages, a message. The first server can be configured to categorize the message under a first category or a second category. The first server removes, from the message, one or more words that match a predetermined set of stop words. The first server replaces one or more character strings included in the message that are associated with stem words with the corresponding stem word. The first server determines a frequency of each of the words included in the modified message. The first server determines, using a probabilistic engine executing on the first server, a relevancy score of the modified message indicating a level of relevance between the message and the first category based on the determined frequency of each of the words. The probabilistic engine can use training data including a first list of messages including a predetermined number of messages previously categorized under the first category and a second list of messages previously categorized under the second category. The second list of messages can include the same predetermined number of messages as the first list of messages. The messages in the first list of messages or the messages in the second list of messages can include one or more of the stem words. The first server, responsive to determining that the relevancy score satisfies a threshold, can categorize the message under the first category.

In some implementations, the first server can analyze the message to determine an intent of the message. The first server can determine the intent of the message based on the messages in the first list of messages and the second list of messages.

In some implementations, the first server can determine that the intent of the message includes an intent to purchase a product or service identified by the message and responsive to determining that the intent of the message includes an intent to purchase a product or service identified by the message, the first server can categorize the first message under the first category. In some implementations, each message included in the first list of messages is selected responsive to determining that the message is relevant to one or more keywords.

In some implementations, the first server can identify an entity for which to categorize the plurality of messages, determine, based on the identified entity, one or more keywords related to the entity, select a first category based on the determined keywords and identify, for the selected first category, a subset of the stem words corresponding to the first category. In some implementations, each message of the first list of messages includes at least one stem word included in a first set of stem words and each message of the second list of messages includes at least one stem word included in a second set of stem words. In some implementations, the first server receives the plurality of messages responsive to a query identifying one or more keywords and a geographic location identifier. In some implementations, the plurality of messages maintained on the first server include real-time messages not exceeding a predetermined character length.

In some implementations, determining, using a probabilistic engine executing on the server, a relevancy score of the modified message indicating a level of correlation between the message and the first category based on the determined frequency of each of the stem words includes determining, from the message, an intent score indicating a level of intent to purchase a particular product or service.

In some implementations, the message includes a first message. In some such implementations, responsive to categorizing the message under the first category, the first server selects a content item suitable to include in a second message and transmits the second message including the content item to the second server to provide, for display, on a computing device at which the first message was originated. In some implementations, the content item includes one of a coupon, a code, a link or an offer to purchase a product or service identified by one or more words included in the first message.

At least one aspect of the present solution is directed to a system of categorizing messages. The system includes a first server configured to communicate with a second server maintaining a plurality of social media messages. The first server is further configured to identify a plurality of social media messages and remove, for each message of the plurality of social media messages, from the message, one or more words that match a predetermined set of stop words. The first server is further configured to replace, for each message of the plurality of social media messages, one or more character strings included in the message that are associated with stem words with the corresponding stem word. The first server is configured to determine, for each message of the plurality of social media messages, a frequency of each of the words included in the modified message and determine, for each message of the plurality of social media messages, using a probabilistic engine executing on the first server, a relevancy score of the modified message indicating a level of relevance between the message and the first category based on the determined frequency of each of the words. The probabilistic engine can use training data including a first list of messages including a predetermined number of messages previously categorized under the first category and a second list of messages previously categorized under the second category. The second list of messages can include the same predetermined number of messages as the first list of messages. The messages in the first list of messages or the messages in the second list of messages include one or more of the stem words. The first server can be configured to categorize, from the plurality of social media messages, one or more messages under the first category responsive to determining that the relevancy scores of the one or more messages satisfies a threshold and sort the one or more messages under the first category in one of a chronological order or a reverse chronological order based on timestamps corresponding to when the message was received by the second server.

In some implementations, the first server is further configured to analyze the message to determine an intent of the message based on the messages in the first list of messages and the second list of messages. In some implementations, the first server is further configured to determine, for at least one message of the plurality of messages, that the intent of the message includes an intent to purchase a product or service identified by the message and responsive to determining that the intent of the message includes an intent to purchase a product or service identified by the message, categorize the message under the first category.

In some implementations, the first server is further configured to identify an entity for which to categorize the plurality of messages and determine, based on the identified entity, one or more keywords related to the entity. The first server is further configured to select a first category based on the determined keywords and identify, for the selected first category, a subset of the stem words corresponding to the first category.

In some implementations, each message of the first list of messages includes at least one stem word included in a first set of stem words and each message of the second list of messages includes at least one stem word included in a second set of stem words. In some implementations, the first server is further configured to receive the plurality of messages responsive to a query identifying one or more keywords and a geographic location identifier.

In some implementations, the first server is configured to responsive to categorizing a first message under the first category, select a content item suitable to include in a second message responsive to the first message and transmit the second message including the content item to the second server to provide, for display, on a computing device at which the first message was originated. In some implementations, the content item includes one of a coupon, a code, a link or an offer to purchase a product or service identified by one or more words included in the first message. In some implementations, each message included in the first list of messages is selected responsive to determining that the message is relevant to one or more keywords.

In yet another aspect, a data evaluation system includes a first component that builds a set of data used to determine whether packages of data are in a first category or a second category, and a second component that trims the set of data to consider only a select number of recent packages of data.

In yet another aspect, a data evaluation system includes a first component that builds a set a data used to determine whether packages of data are in a first category or a second category, and a second component that limits the set of data to build to no more than a select number of packages of data.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4 is a chart showing how the probability of a user getting more "relevant" messages has been shown to increase over time as a data evaluation system constructed according to the teachings of the present invention learns;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for categorizing messages.

A. Computing and Network Environment

Figure 1A:
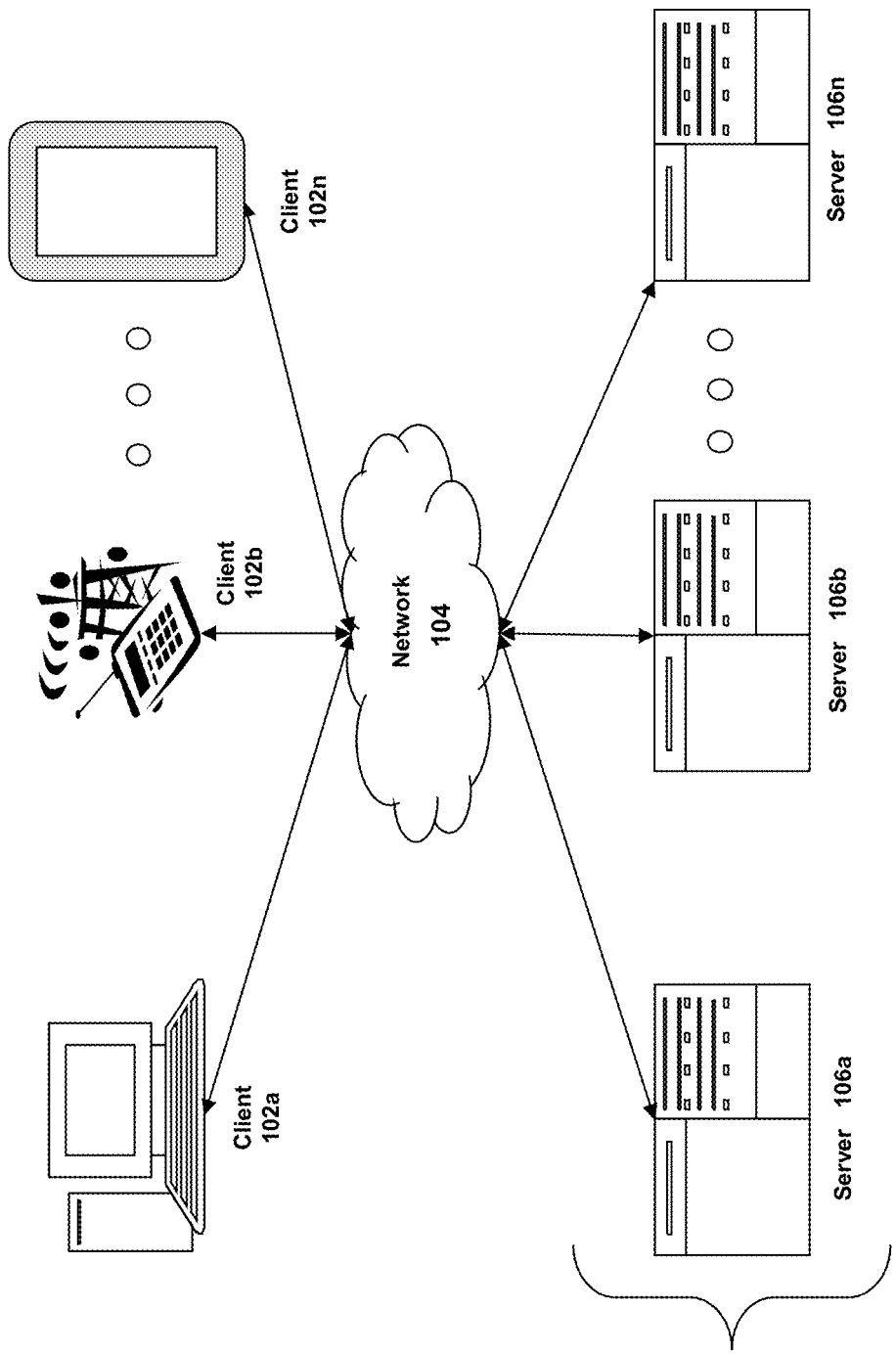
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106an-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
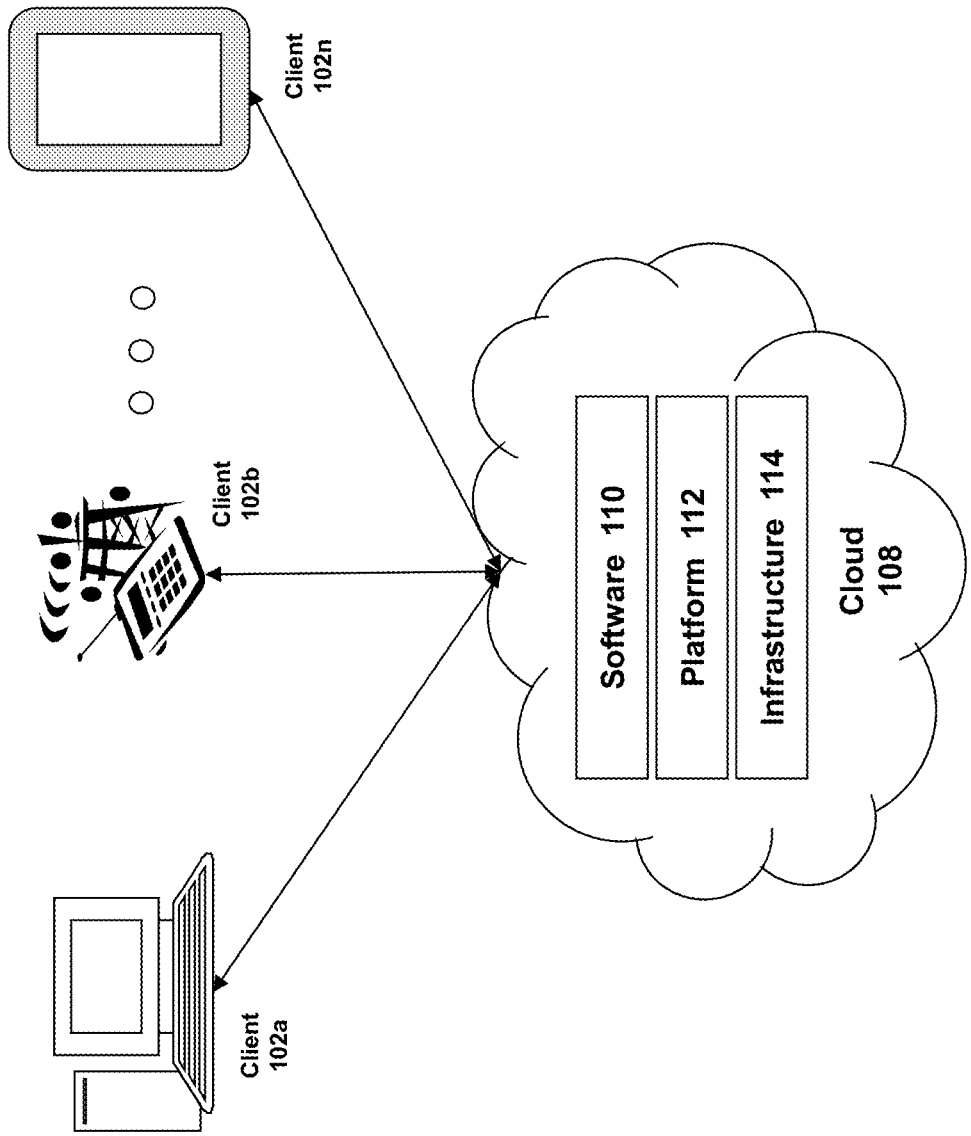
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
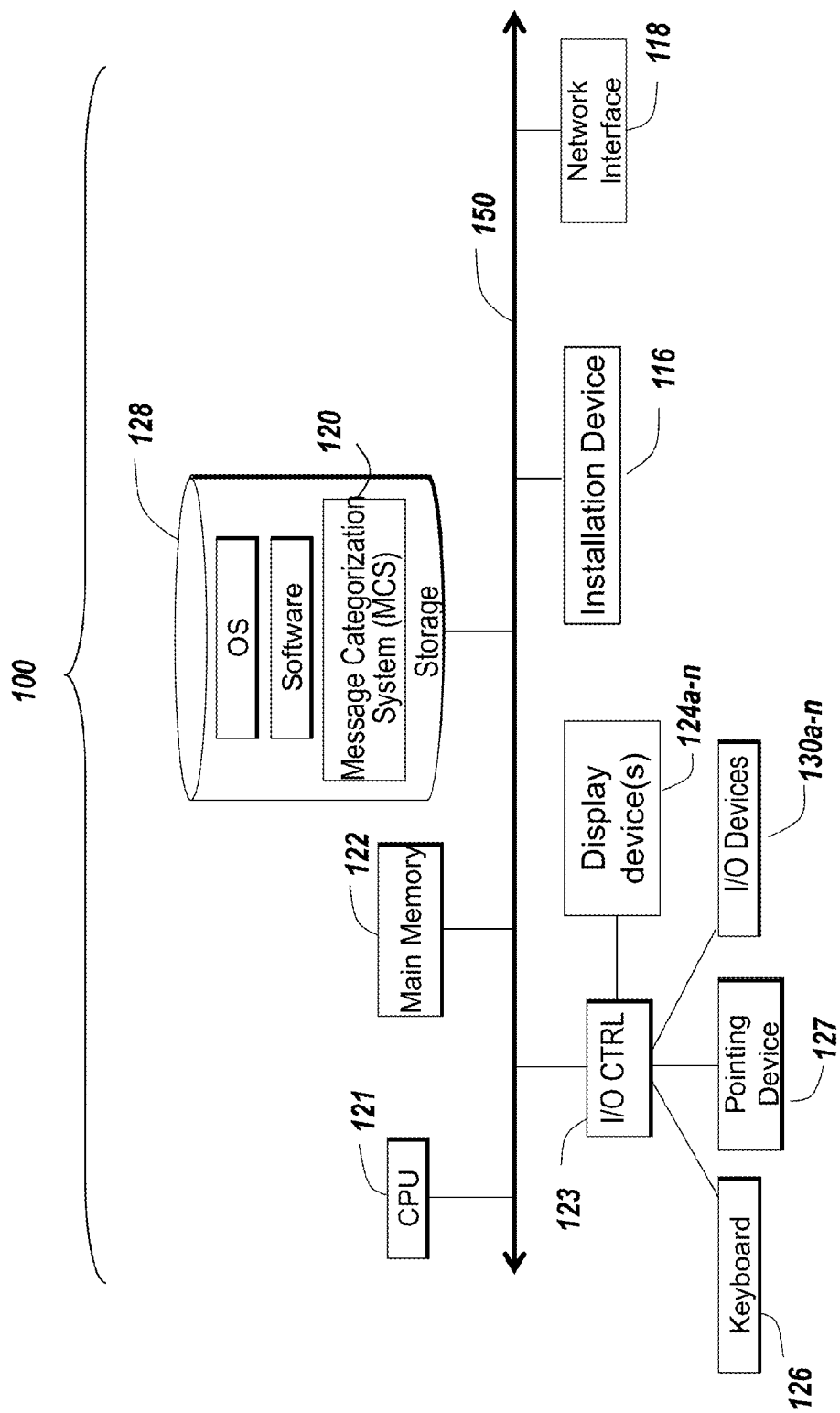
FIGS. 1C and 1D are block diagrams depicting embodiments of computing devices useful in connection with the methods and systems described herein.
Figure 1D:
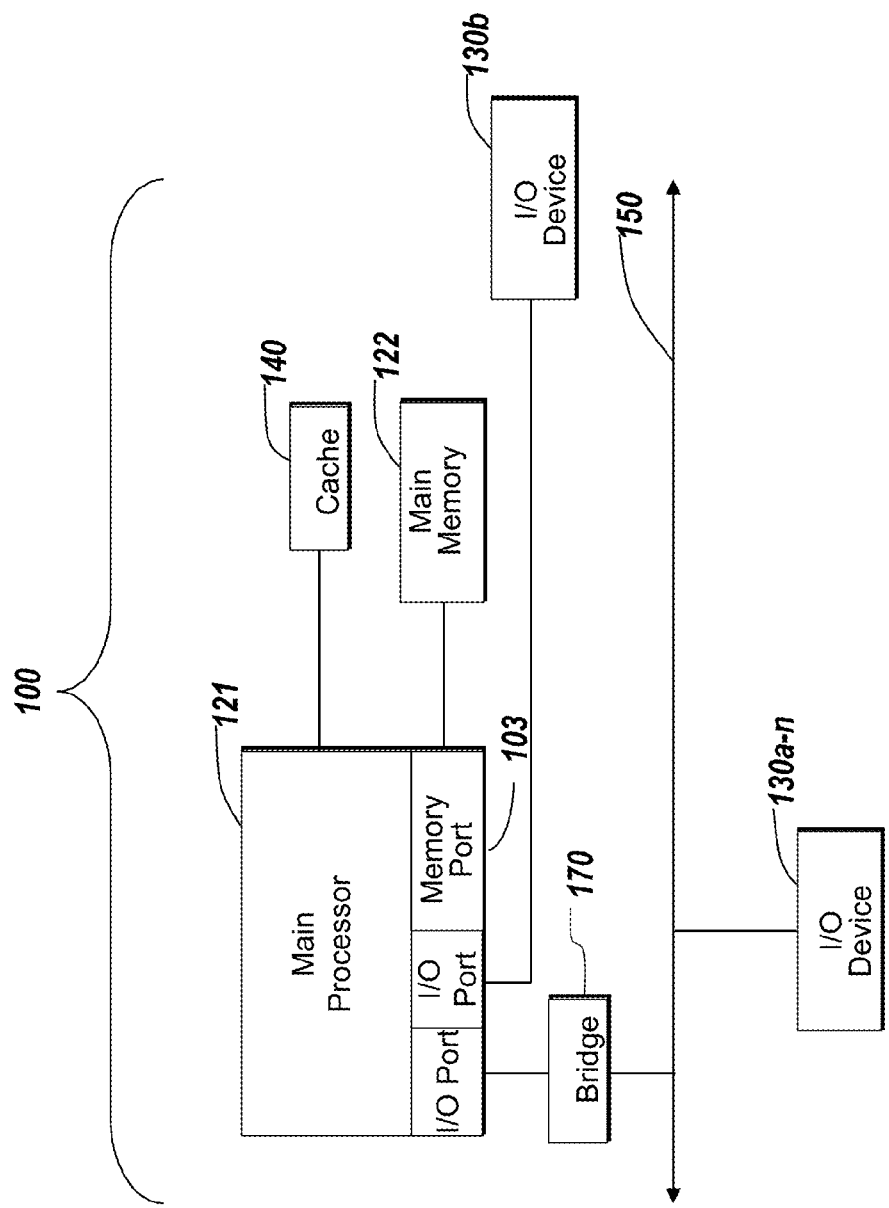

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a message categorization system (MCS) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124an-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124an-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124an-124n may also be a head-mounted display (HMD). In some embodiments, display devices 124an-124n or the corresponding I/O controllers 123 may be controlled through or have hardware support for OPENGL or DIRECTX API or other graphics libraries.

In some embodiments, the computing device 100 may include or connect to multiple display devices 124an-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124an-124n by the computing device 100. For example, the computing device 100 may include any type and/or form of video adapter, video card, driver, and/or library to interface, communicate, connect or otherwise use the display devices 124an-124n. In one embodiment, a video adapter may include multiple connectors to interface to multiple display devices 124an-124n. In other embodiments, the computing device 100 may include multiple video adapters, with each video adapter connected to one or more of the display devices 124an-124n. In some embodiments, any portion of the operating system of the computing device 100 may be configured for using multiple displays 124an-124n. In other embodiments, one or more of the display devices 124an-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124an-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the MCS 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2022, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Message Categorization System

With the advent of social media, there is a plethora of content available and accessible to users. Users can generate their own content for others to access. The content may include an indication of a user's particular thoughts, interests, intents, opinions, views, among others. The content may also include information relating to one or more topics, trends, products, services, or anything that piques the user's interest. Companies have attempted to extract, extrapolate, or otherwise collect data from user generated content and leverage the data for various commercial, social, academic, or non-commercial endeavors.

The present disclosure relates to categorizing social media content, for instance, social media messages generated by users of one or more social networks. Examples of these messages can include tweets on Twitter, posts via Facebook, photos on Instagram, pins via Pinterest, among others.

Figure 2:
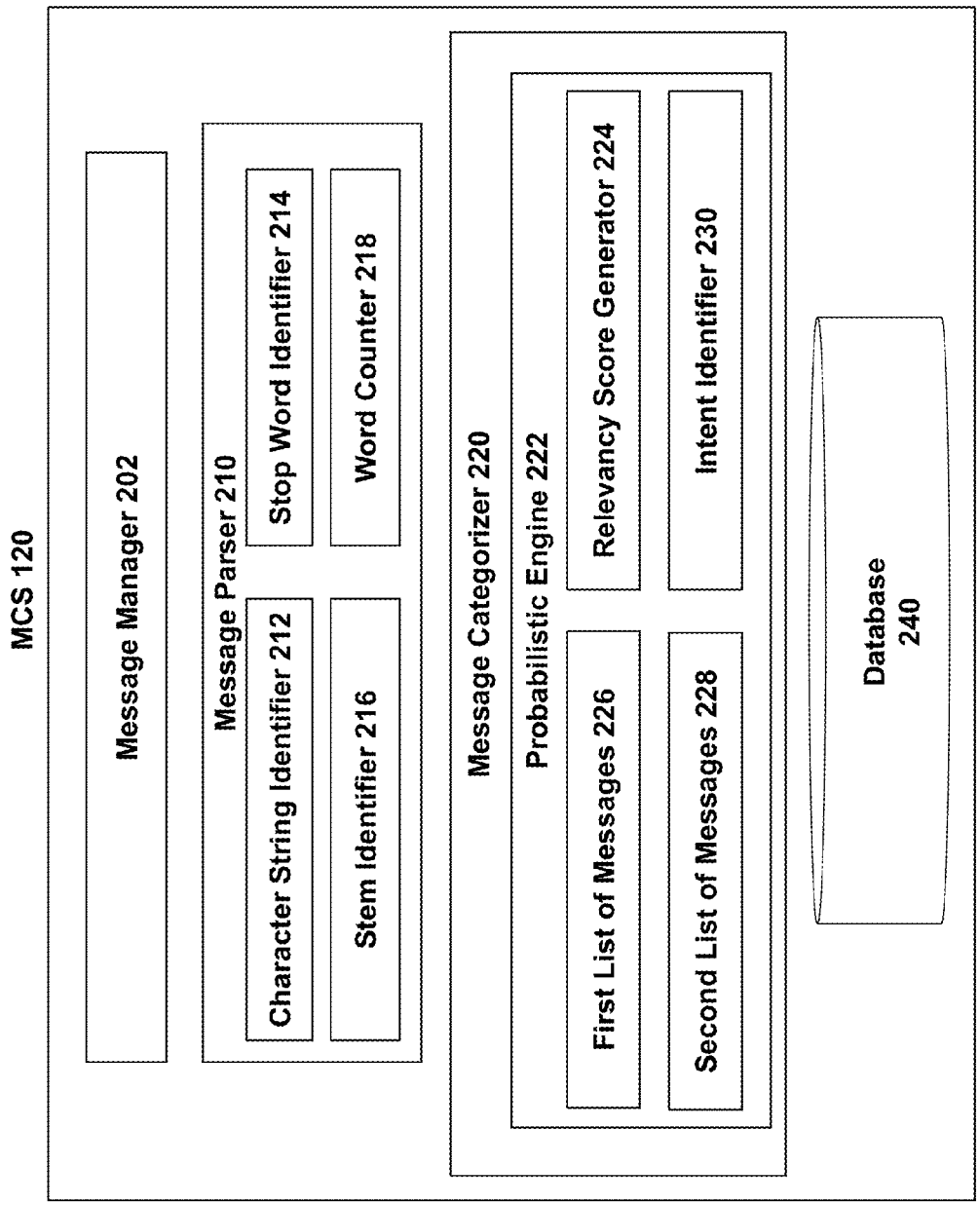
FIG. 2 is a block diagram depicting an embodiment of a system of categorizing messages.

Referring now to FIG. 2, a block diagram depicting an embodiment of a system 120 for categorizing messages is shown. In brief overview, the system 120 can include a message manager 202, a message parser 210, a message categorizer 220, and a database 240. The message parser 210 can include a character string identifier 212, a stop word identifier 214, a stem identifier 216 and a word counter 218. The message categorizer 220 can include a probabilistic engine 222 that includes a relevancy score generator 224, a first list of messages 226, a second list of messages 228 and an intent identifier 230. Each of the message manager 202, the message parser 210 (and its components) and the message categorizer 220 (and its components) can each include one or more processing units or other logic devices such as programmable logic array engines, modules, or circuitry designed and constructed to facilitate categorizing messages. In some implementations, the message manager 202, the message parser 210 (and its components) and the message categorizer 220 (and its components) can include a script, computer-executable instructions, a file, or other executable object that can be used to categorize messages, such as social media messages. The system 120 can include components 100 shown in FIG. 1C or FIG. 1D or be configured to operate as a service in cloud 108. The system 120 can include or interact with one or more servers 106a-n and clients 102a-n.

The message manager 202 can be configured to manage messages received by a server of the MCS 120. As described herein, messages can include social media messages. Social media messages can include messages received by the MCS 120 via one or more servers of social networks. In some implementations, the social media messages can be messages generated by users of social networks. In some implementations, the message manager 202 can manage other types of messages, including text messages, mobile application messages, or other communication formats. In some implementations, the messages can be originated at a computing device of a user and may possibly reflect an intent of a user. Examples of messages can include tweets, posts, SMS messages, WhatsApp messages, Facebook messages, among others.

In some implementations, the message manager 202 may retrieve the messages via application program interfaces (APIs). In some implementations, the message manager 202 can receive messages from servers of websites or entities via API calls. In some implementations, the message manager 202 can initiate an API call to a server of a social network, for instance, Twitter, to retrieve messages. In some implementations, the API call can identify one or more keywords and one or more search filters, including geographic filters, demographic filters, among others. For instance, the API call can include a request for messages that include the keyword "pizza" and include a geographic filter "Boston, MA" indicating that the users tweeting the messages that include the keyword pizza are located in Boston, Mass.

In some implementations, the message manager can be configured to receive one or more messages in real time responsive to a server of a social network or other entity receiving the messages. In some implementations, the message manager can be configured to periodically make API calls to servers maintaining a plurality of messages. Responsive to the API calls, the message manager can receive messages maintained on the servers of one or more social networks or other entities.

The messages received by the message manager 202 can be redacted or otherwise modified to not include one or more items of information that the server of the social network does not want to share with the message manager 202. For instance, the message received by the message manager 202 can be modified to not include any information identifying a particular user, for instance, the user generating the message or one or more user identifiers to which the message is addressed or to user identifiers tagged in the message. In some implementations, the messages can be modified to not include links or other types of data, for instance, icons, emoticons, among others.

The message parser 210 of the MCS 120 can be configured to parse one or more messages received by the message manager 202. The message parser 210 can include the character string identifier 212, the stop word identifier 214, the stem identifier 216 and the word counter 218. In some implementations, the character string identifier 212 can identify various permutations of the characters included in the message to identify one or more character strings. In some implementations, the character string identifier can apply one or more character string identification rules to identify character strings. In some implementations, the rules can include a predetermined list of character strings having a particular significance.

The character string identifier 212 can also be configured to identify one or more special characters included in the message. For instance, the character string identifier 212 can be configured to identify a # (hash), which can be indicative of a hashtag. A series of characters that append to a # may form a hashtag. In some implementations, a hashtag can be treated differently than other character strings identified in the message. Similarly, the character "4" if separated by spaces or alphabets may be identified as a special character and may be indicative of the word 'for.'

The character string identifier 212 can be configured to identify one or more words in in a message. The character string identifier 212 can be configured to identify words by identifying a sequence of alphabets and matching the sequence of alphabets with a predetermined list of character strings, for instance, a list of character strings included in a database, such as a dictionary. In some implementations, the character string identifier 212 can identify non-words (such as links) and remove them from messages. Further, the character string identifier 212 can identify words that are prepended or appended by special characters. These words are either removed or the special characters (such as #, @, RT, FWD, among others) are stripped away. Special characters can include non-alpha characters as well as other character sequences (for example, RT (retweet), FWD (forward)) that are automatically inserted in the message based on actions taken by people generating social media messages.

In some implementations, the character string identifier can be configured to identify misspelt words. The misspelt words can include words containing typographical errors, acronyms, or other words commonly used to represent particular words. The character string identifier can replace the identified misspelt words with correctly spelt words.

The stop word identifier 214 can be configured to identify one or more words included in the message that match words in a stop word list. A stop word can include words that can be removed from the message. In some implementations, stop words may include words that are not considered by the message categorizer 220 when categorizing words under a particular category. Examples of stop words can include conjunctions, prepositions, pronouns, some verbs, adverbs, among others. In some implementations, the list of stop words may vary based on the categories within which to categorized messages. In some implementations, if the messages are to be categorized into a fist category corresponding to messages that are relevant to a particular advertiser or a second category corresponding to messages not relevant to the advertiser, the stop words may be received from the advertiser or may be selected based on an industry of the advertiser.

When parsing the message, the message parser 210 can be configured to modify the message by identifying stop words included in the message and removing the stop words from the message. The message parser 210 can be configured to generate a copy of the received message and remove stop words from the copy of the received message. In some implementations, the message parser 210 can replace misspelt words with correctly spelt words as well.

The stem identifier 216 can be configured to identify, from the message, one or more words that correspond to stem words. In some implementations, the words that correspond to stem words may include words including gerunds, a plural form of the stem word, a past, present or future tense of the word, among others. For example, the words "running," "ran," and "runs" may all be identified as words that correspond to the stem word "run." The stem identifier 216 can be configured to determine, from each of the identified word in the message, whether the word has a corresponding stem word and responsive to determining that the word has a corresponding stem word, replacing the word with the stem word.

The word counter 218 can be configured to determine a frequency of each of the words included in the message. In some implementations, the word counter 218 may determine a frequency of each of the words included in the message after the stop words have been removed, misspelt words have been replaced and words corresponding to stem words have been replaced with the corresponding stem words. The word counter 218 may store, for each message, a table identifying each of the words and a number corresponding to a frequency of the word.

The message parser 210 can perform other functionality too. The message parser 210 may employ context-based algorithms to determine the context of a particular word that may have multiple meanings In some implementations, the message parser 210 may utilize one or more third-party databases that include multiple meanings of words. For instance, the word 'sick' can have two different meanings. For instance, "my dog is sick" can mean 'my dog is ill' while in the context of a pizza, 'the pizza is sick' will typically mean the pizza is very good. As such, the message parser 210 can employ various context based algorithms to better understand the context of a message or particular words included in the message.

The message categorizer 220 can include the probabilistic engine 222 that includes the relevancy score generator 224, the first list of messages 226, the second list of messages 228 and the intent identifier 230. The probabilistic engine 222 can be configured to categorize messages under one of a plurality of categories based on probabilities. Generally, an engine that is configured to categorize data can use Bayes Theorem to operate. Simplistically stated, Bayes Theorem holds that an Initial Belief+Recent Objective Data=A New and Improved Belief. In the sphere of "relevant" versus "irrelevant" messages, where the engine presents to the user the largest number of "relevant" messages to be responded to, the Initial Belief could be "here are messages that could be dealt with;" the Recent Objective Data could be "here is how similar messages were handled;" and The New and Improved Belief could be "here is a new set of messages that are more likely to be positively dealt with."

Bayes Theorem, which may be stated as $$P(A \mid B) = \frac{P(B \mid A)P(A)}{P(B)},$$

where A and B are events, P(A) and P(B) are the probabilities of A and B without regard to each other, P(A|B), a conditional probability, is the probability of A given that B is true and P(B|A), is the probability of B given that A is true. Thus, the conditional probability of A given that B is true equals (the conditional probability of B given that A is true times the unconditional probability of A) divided by the unconditional probability of B. Or, more simply, the amount of support that B provides for A [P(B|A)/P(B)] times the initial degree of belief in A [P(A)] equals the degree of belief in A, having accounted for B [P(A|B)].

Aspects of the present disclosure are based in part on the concepts that the output of Bayes Theorem [P(A|B)] can be improved if the sensitivity of the test [P(B|A)] is improved and that the sensitivity of the test can be improved by trimming or limiting by time the data provided to Bayes Theorem.

The probabilistic engine 222 can be configured to utilize the first list of messages 226 and the second list of messages 228 as training data to train the probabilistic engine. In some implementations, the first list of messages can include messages previously categorized as belonging to a first category, while the second list of messages can include messages previously categorized as belonging to a second category. In some implementations, the list of messages can include messages manually categorized as belonging to the respective category. In some implementations, the first list of messages and the second list of messages can be updated periodically. In some implementations, older messages included in the first list of messages and the second list of messages can be replaced with messages that were more recently received by the MCS 120. In this way, the accuracy of the probabilistic engine 222 in categorizing messages under either of the first or second category can be improved.

In some implementations, the probabilistic engine 222 can be configured to analyze the messages included in the first list of messages and the second list of messages and determine features of messages included the first list of messages to identify characteristics of messages included in the first list of messages. Similarly, the probabilistic engine 222 can be configured to determine features of messages included the second list of messages to identify characteristics of messages included in the second list of messages. In some implementations, the analysis may include parsing each message and determining a frequency of each word in each message and extrapolate, from the messages of the first list or the messages of the second list, characteristics that may be relevant to determine if a message can be categorized under the first category or the second category. In some implementations, the characteristics can be based on the words included in the message, the types of words included in the message, the frequencies of each of the words or word types, among others.

Using the training data, the relevancy score generator can determine, for a particular message parsed by the message parser 210, a relevancy score. The relevancy score can be specific to a particular category or may be generic to multiple categories. That is, if the relevancy score is greater than a first predetermined number, the message satisfies a particular threshold value and is deemed relevant enough to be classified under the first category. Conversely, if the relevancy score is less than a predetermined second number, the message fails to satisfy the second threshold value and is deemed not relevant enough to be classified under the second category. In some implementations, the first predetermined number and the second predetermined number can be the same number.

In some implementations, the probabilistic engine 222 can be configured to determine an intent of a message. In some implementations, the intent of a message can be determined based on the frequency of one or more of the words included in the message. In some implementations, the probabilistic engine 222 can, via the intent identifier 230, determine an intent of a message. The intent of a message can be the intent of the user who generated the message. For instance, a message "I am hungry for pizza. So hungry. #pizza4life" can be analyzed by the probabilistic engine 222. The probabilistic engine 222 can determine, from the words and the frequency of each of the words, that the user is hungry and has an intention towards getting a pizza to satisfy their hunger.

The database 240 can include one or more databases. The database 240 can maintain a plurality of messages received from one or more servers of social networks. The database 240 can maintain one or more lists of stop words. In some implementations, the database can maintain one or more lists of stem words. In some implementations, the database can maintain, for various advertisers or clients, account information associated with the client, including but not limited to information about keywords to identify in messages, message categories specific to the client, among others. In some implementations, the database can maintain information used to generate the probabilistic engine, including but not limited to one or more lists of previously categorized messages.

Figure 3A:
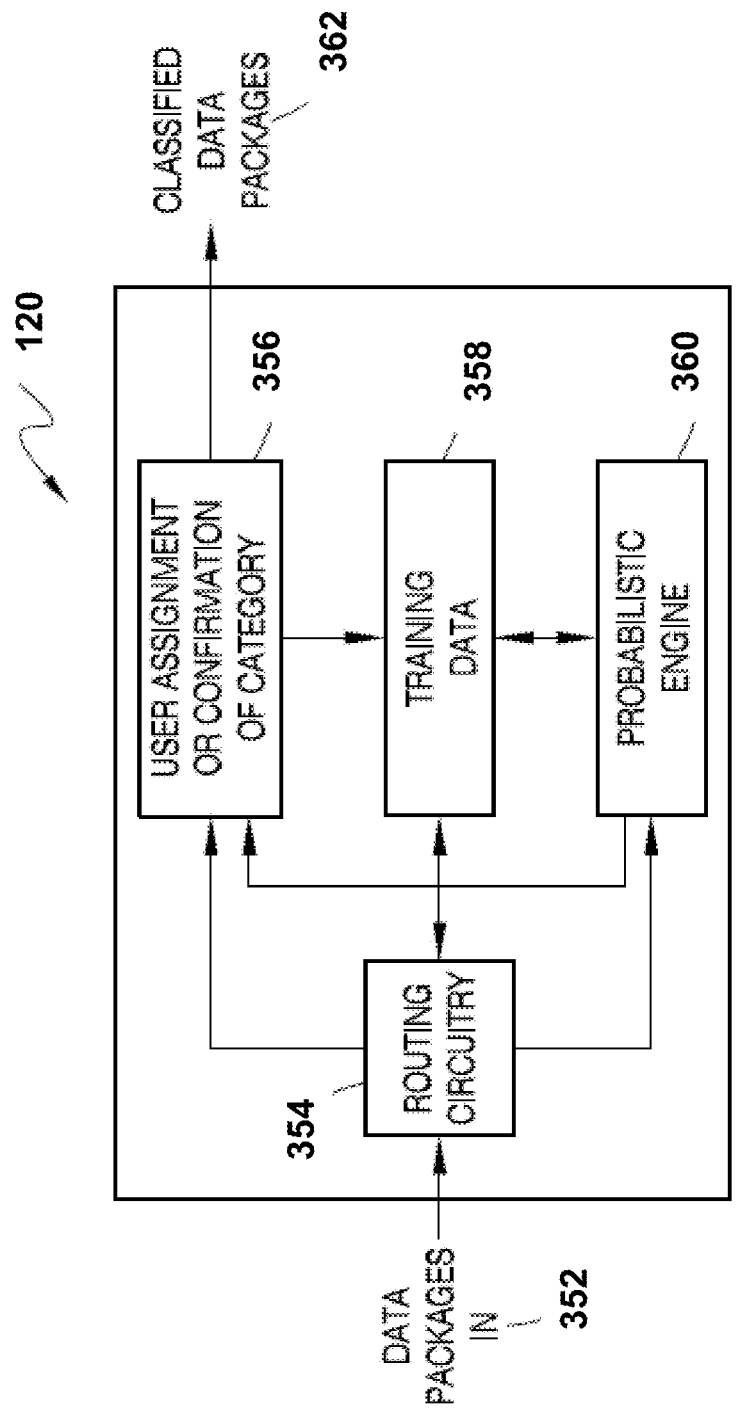
FIG. 3A shows a block diagram of the message categorization system.

Referring now to FIG. 3A, a block diagram of the message categorization system is shown. The system can receive relevant messages, irrelevant messages and messages of unknown relevance to a particular user, such as an advertiser. The system can generate a probabilistic engine that is configured to learn, using the relevant messages and the irrelevant messages, the probability of a message of unknown relevance being relevant. The probabilistic engine can determine the probability by analyzing the words included in the message. System 120 can be configured to receive data packages 352 including messages that need to be classified (or "categorized"), and to output a category under which to categorize the data packages 362. The system 120 can utilize two ways of classifying the data packages 352, either by user assignment of category 356 or by operation of a probabilistic engine 360.

The system 120 can include circuitry 354 that routes the data packages 352 either to the user assignment of category circuitry 356 or to the probabilistic engine 360. Circuitry 354 routes the data packages 352 based upon training data that is trimmed and/or moved to a predetermined level, as discussed in greater detail herein. Routing circuitry 354 is connected to a training data element 358 to enable it to make a desired routing decision.

By operation of circuitry 356, a user of system 120 decides how any given data package should be classified and then assigns it to a category, or, in the event assignment of category has already been effected by, for example, a probabilistic engine, the user can confirm the category assigned. The user determination of category selected is output at 362. In the event that assignment of a category to a data package 352 is effected by some other means, the user confirms the assignment at element 356, and system output 362 consists of both data packages that are assigned to a category at element 356 or confirmed to be in an already assigned category at element 356.

A data package classified as "relevant" v. "non relevant" for a coffee shop could always include the keyword phrase "need coffee." In such a case, training data element 108 would include the key to categorization (hereinafter, "a categorization rule, which, in this case, is the keyword phrase found to always appear in "relevant" data packages).

The information in the training data element is "balanced" to ensure that it enough examples of data sent to each category to be useable for subsequent classification and "moved" to include only a recent sampling of data to ensure that any subsequent classification of data uses the most recent examples.

The second of the two ways data packages 352 are classified is by operation of a probabilistic engine 360. The probabilistic engine 362 uses Bayes Theorem to determine the probability that a data package 352 is in any given category [P(A|B)] based on the sensitivity of the test [P(B|A)] times the unconditional probability that a data package is in the given category [P(A)], the aforementioned multiplication divided by the unconditional probability that a data package is in a category other than the given category [P(B)].

As shown in FIG. 3A, the probabilistic engine 360 is connected to training data element 358 so that it can provide information to stock, balance and/or move its contents and to element 356, so that the category selected by the engine 360 can be confirmed by the user. Additional details relating to the system 120 as described in FIG. 3A are provided with respect to FIG. 3B.

Figure 3B:
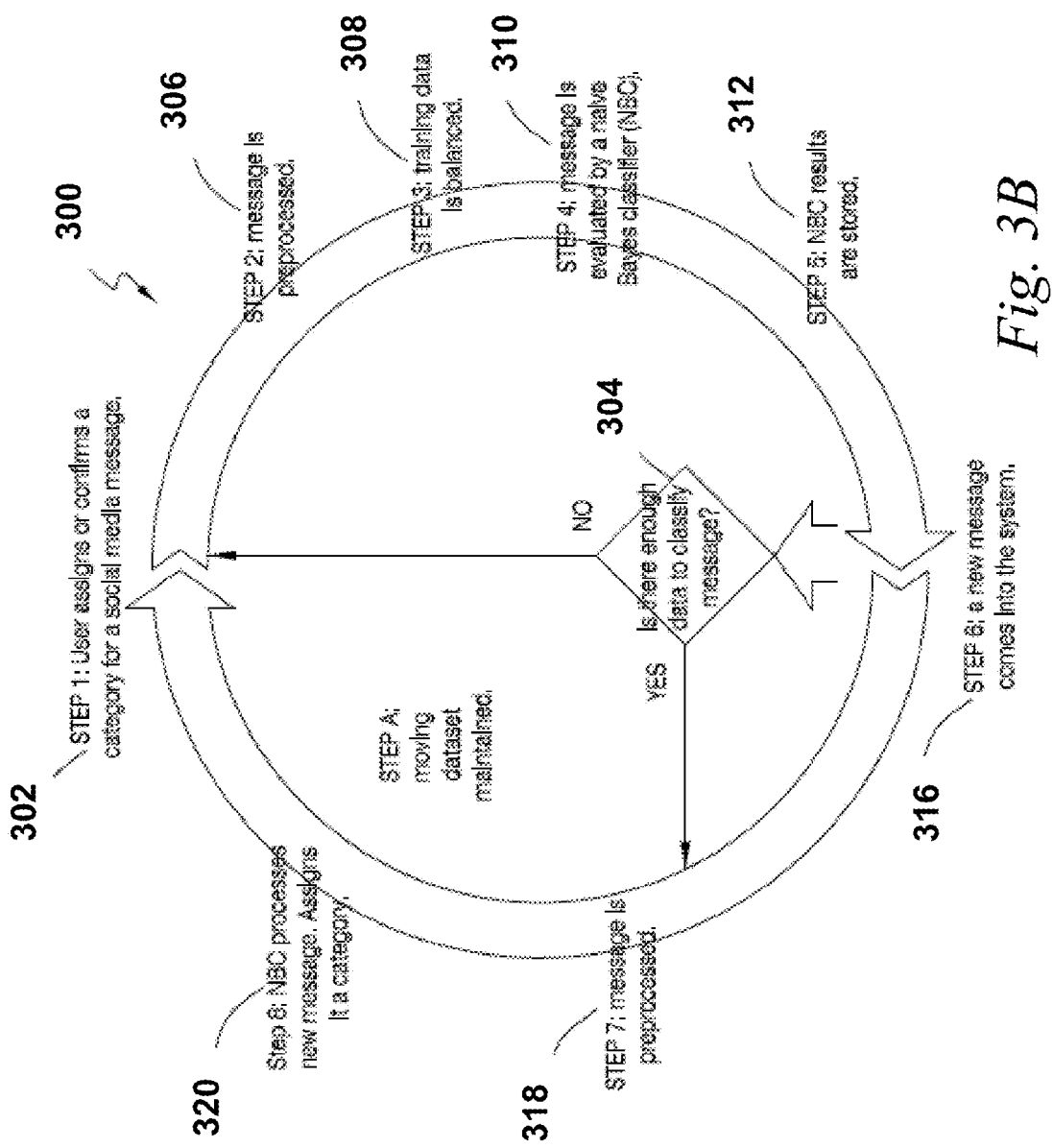
FIG. 3B is a process flow of a method of categorizing messages in connection with the methods and systems described herein.

FIG. 3B is a process flow of a method of categorizing messages in connection with the methods and systems described herein. The flow 300 utilizes a moving dataset that is used as training data by a probabilistic engine of the system, such as the MCS system 120 executing the flow 300. The flow is broken into two stages, a first stage including step 1 (302) to step 5 (312) and a second stage including step 6 (316) to step 8 (320). In the first stage, the system can receive messages and classify them into one of two categories. The messages included in one of two categories can be used by the system as training data to train a probabilistic engine of the system to categorize additional messages received by the system. In the second stage, the system can receive one or more messages after the probabilistic engine has been trained and these messages can be processed and then categorized by the probabilistic engine.

Referring now to the steps in the first stage, at step 1 (302), a user of the system assigns or confirms a category for a social media message. In some implementations, the user can manually assign or confirm a category for a social media message. In some implementations, the user can request to categorize or process one or more social media messages received from a server of a social network. In some implementations, the user can provide one or more message search parameters that the system can implement to identify a plurality of messages that satisfy the message search parameters. For instance, the user may be a pizza retailer, and the user may be interested in all messages, for example, tweets, that include the word pizza or hungry. The message search parameter can include a further limitation that filters messages based on a geographic location of the identifier associated with the submission of the tweet.

In some implementations, from the messages that satisfy the message search parameters, the user can categorize the message to a particular category. If the user finds the message relevant, the user may categorize the message under the first category or relevant category. In some implementations, the user may find the message relevant but may determine that the message may adversely affect the probabilistic engine's performance if the message as identified as being relevant. In some implementations, the user may assign it to another category or provide a relevancy score below other messages that the probabilistic engine can learn from. Conversely, if the user finds the message irrelevant, the user may categorize the message under the second category or irrelevant category.

As an example, if the message is "I'm hungry for pizza," the user may find the message relevant and assign it to the first category. This may be because the person generating the message has expressed an interest in ordering or otherwise eating a pizza. However, if the message is "why are pizza ads so boring," the user may find the message irrelevant. As such, the user may categorize messages based on an intent of the person generating the message that can be derived from the content of the message. By categorizing messages according to the intent associated with the message, the user may be able to categorize a plurality of messages in which the message relates to an intent to purchase or order a pizza under a first category. All other messages in which there is no associated intent to purchase or order a pizza can be categorized under a second category. In some implementations, the system can perform step 1 (302) in response to determining that the probabilistic engine does not have enough data to categorize the message (see 304).

At step 2 (306), after the user categorizes the message under either the first category or the second category, the system 120 preprocesses the message. Preprocessing the message can include the functions performed by the message parser 210 described with respect to FIG. 2. In some implementations, non-words (such as links) are removed from messages and valid words that are prepended or appended by special characters are either removed or the special characters are stripped away.

At step 3 (308), the system stores the preprocessed messages as training data. The training data can include a first list of messages corresponding to the first category and a second list of messages corresponding to the second category. The system can then balance the training data by maintaining an equal number of messages in both the first list of messages and the second list of messages. For example, the preselected maximum number of messages for each category could be 500 and in such a case, with there being a category A and a category B, the system can be configured to store 500 category A training records and 500 category B training records. Having a balanced number of training records improves test sensitivity for the Bayes Theorem executing probabilistic engine. Having a preselected maximum number of training records maintained for each category can provide performance optimization with the number chosen to provide an adequately sized, but not overly large, test sample.

After incoming messages are preprocessed and after training data compilation work is done, at step 4 (310), a message parser or Naïve Bayes Classifier (NBC) of the system evaluates the message. Evaluating the message can include processing the message. In some implementations, processing the message can include removing stop words, replacing misspelt words with correctly spelt words and replacing words corresponding to stem words with the corresponding stem words. In some implementations, evaluating the message can include three components. First, stop words, for example, common, insignificant words such as "or," "and," and "the" are removed. Two, stem words are shortened to a corresponding stem form; for example, "running" is shortened to "run." Third, the frequency of each word in the message is determined. With information about the frequency of each word used in a user categorized message, the NBC, via the message categorizer shown in FIG. 2, learns how to categorize based upon keywords.

At step 5 (312), the system stores, for the message, the frequency of each stemmed, non-stop word in the message. Thus, based upon user input, the system becomes smarter about the frequency of stemmed, non-stop words in messages, and becomes better able to categorize messages independently without user intervention. In some implementations, the system can generate a table that includes a message, a number of stemmed, non-stop words included in the message and a frequency at which each of those words appear in the message. The system can maintain the table for each of the messages included in the first list of messages and the second set of messages. The table can be updated as the messages in the first list and second list are updated.

Step 6 to step 1 correspond to the second stage. As described above, in the second stage, the system can receive one or more messages after the probabilistic engine has been trained and these messages can be processed and then categorized by the probabilistic engine. As such, step 7 (216) through step 1 (302) (for confirmation), as shown in FIG. 3, correspond to a routing decision to use the probabilistic engine to categorize the messages.

At step 6 (316), a message is received by the system. The message can be received from a server of a social network. The message can be received in response to an API call corresponding to a request by a user to retrieve social media messages from a server. The user can include one or more message selection parameters in the request and responsive to submitting the request, the system can receive one or more messages. The messages can be received by the system responsive to a request from a user. As such, the system can be configured to analyze the messages individually to determine how the user would like to categorize the message. A determination is made as to whether the system has enough data to categorize the message. The system can determine if the system has enough data to categorize the message using the training model. In some implementations, the system can determine if the system has enough data to categorize the message using the training model based on determining whether the first list of messages and the second list of messages that form the training data have been established by the user.

At step 7 (318), responsive to determining that there is enough data to categorize the message, the system preprocesses the message. Preprocessing the message can include the functions performed by the message parser 210 described with respect to FIG. 2. In some implementations, non-words (such as links) are removed from messages and valid words that are prepended or appended by special characters are either removed or the special characters are stripped away.

At step 8 (320), the system processes the message and categorizes the message under the first category or the second category. The system can process the message by removing stop words, replacing misspelt words with correctly spelt words and replacing words corresponding to stem words with the corresponding stem words. In some implementations, the system can evaluate the message. As described above, evaluating the message can include three components. First, stop words, for example, common, insignificant words such as "or," "and," and "the" are removed. Two, stem words are shortened to a corresponding stem form; for example, "running" is shortened to "run." Third, the frequency of each word in the message is determined. With information about the frequency of each word used in a user categorized message, the NBC, via the message categorizer shown in FIG. 2, can use the training model of the probabilistic engine of the system to categorize the message under the first category or the second category. In some implementations, the NBC utilizes the table that includes information related to the messages included in the first list of messages and the second list of messages to determine a probability or likelihood that the message falls under a particular category. The system can determine if the probability satisfies a predetermined threshold, and responsive to determining that the probability satisfies the predetermined threshold, categorize the message under the corresponding category.

From step 8 (320), the flow proceeds to step 1 (302), where the system can categorize the message under the corresponding category. In some implementations, the user can confirm that the categorization determined by the system is correct.

Periodically, certain steps are taken. First, the system can shorten the training data set. For example, if 500 is the determined number of messages to include in the first list of messages and the second list of messages, the first list of messages and the second list of messages can be shortened to some number less than 500, such as 400. Second, the frequency counts of words are recalculated from this now trimmed set of training data. Thus, data collected in the training data record set is continually shortened and regrown; therefore, the training data moves over time and better reflects the most recent word usage when categorizing messages.

FIG. 4 is a chart showing how the probability of a user getting more "relevant" messages has been shown to increase over time as a message categorization system, such as the MCS 120, learns. FIG. 4 presents data (in chart 400, comprising a User Input column 402 and a Probability column 404, with user inputs increasing from 0 to 280) that has been experimentally derived that shows that as MCS 120 gets more training, the probability of its user getting relevant messages goes up. With no user input, the probability is 25%. This is shown in the top data row 410. After 26 user designations that enable construction of a training data record base with balanced and moved data, the probability is 30%. This is shown in the next data row 412. With continued user designations, up to 280 on the chart 400, the probability goes up to 80%, as shown in the bottommost data row 420.

Figure 5:
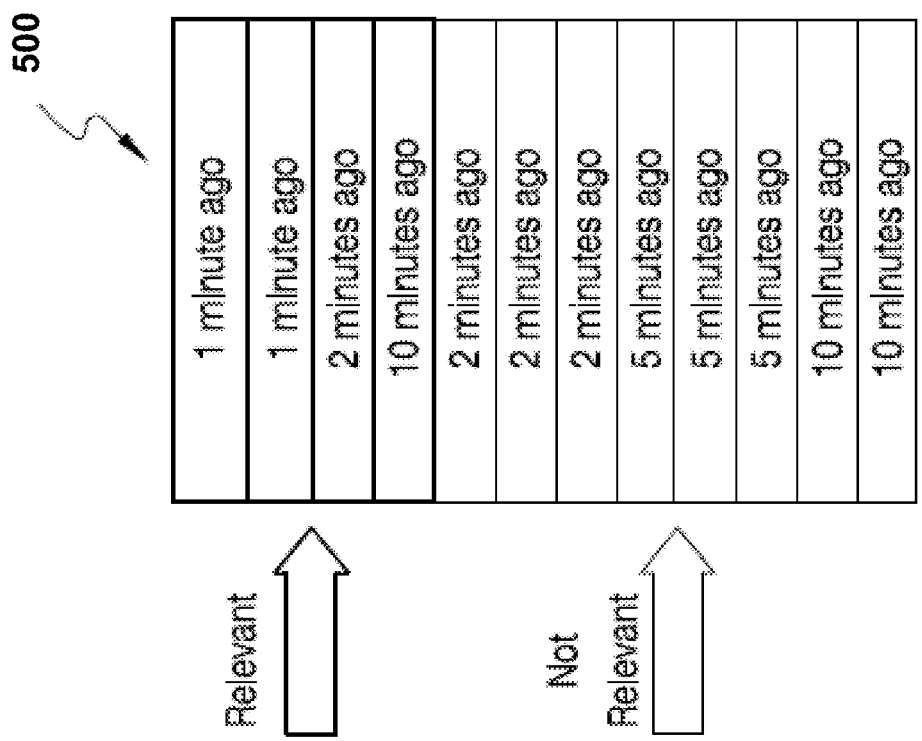
FIG. 5 is a chart showing flow data that could be presented on an informational dashboard in connection with the methods and systems described herein.

FIG. 5 is a chart showing flow data that could be presented on an informational dashboard in connection with the methods and systems described herein. FIG. 5 shows a chart 500 of how the categorized messages can be reported upon on a user dashboard. In chart 500, the messages are sorted by relevance, and then time. As shown, there are four "relevant" messages (for example, tweets), two 1 minute old, 1 one 2 minutes old, and one ten minutes old, and eight "not relevant" messages, three 2 minutes old, three 5 minutes old, and two 10 minutes old. The presentation of the MCS 120 output identifying recent and relevant messages ordered by recency first and relevancy second to a user enables the user to quickly identify the most recent relevant messages. The user can use this information to easily select which messages to generate a response for.

Figure 6:
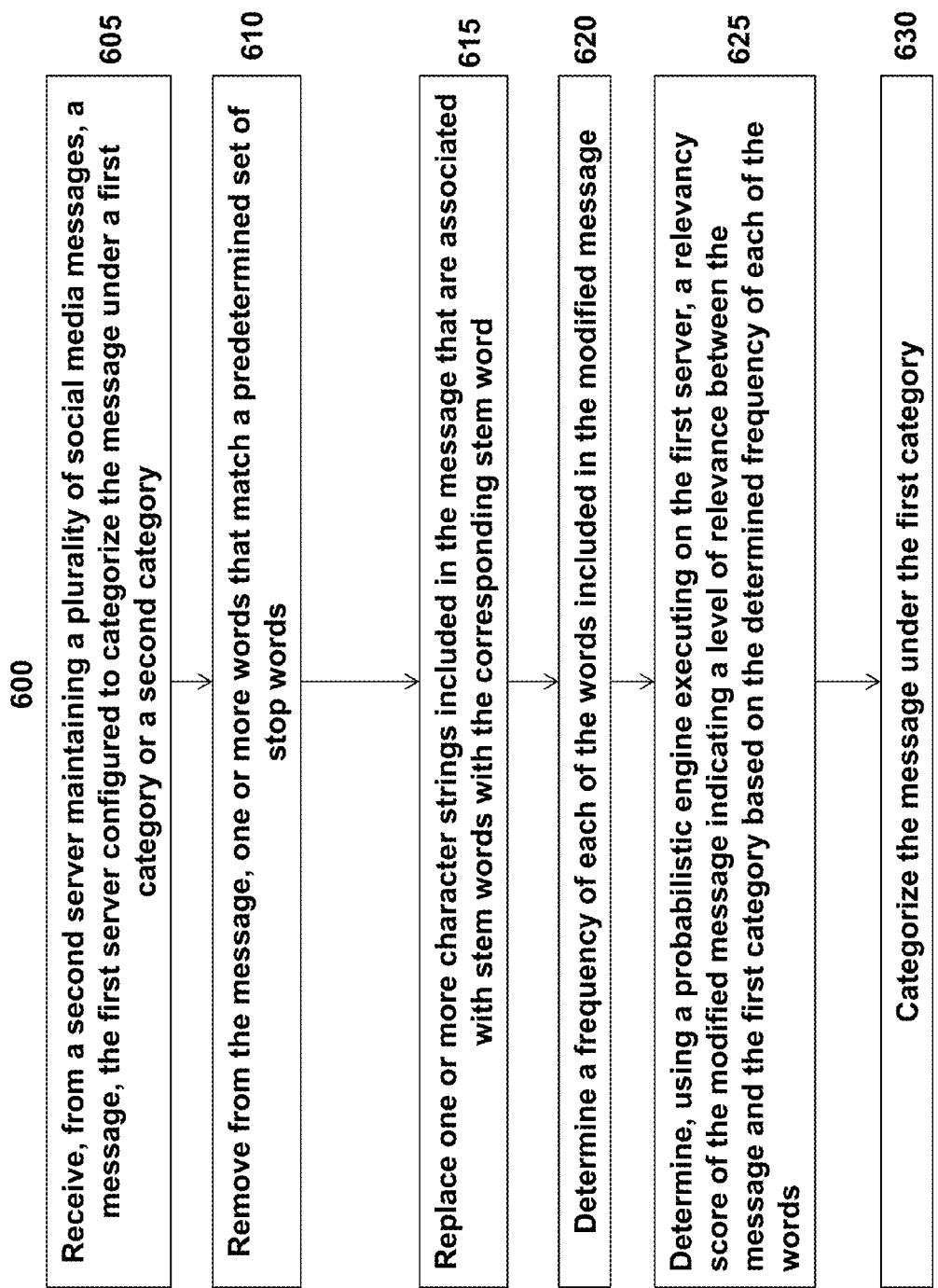
FIG. 6 is a flow chart of a method of categorizing messages.

Referring now to FIG. 6, FIG. 6 is a flow chart of a method of categorizing messages. The functionality described herein in the method 600 can be performed by any one or more components system 100 depicted in FIGS. 1A-1D such as one or more of the servers 106*a-n*, or any one or more components of system 200 depicted in FIG. 2. In brief overview, a first server can receive, from a second server maintaining a plurality of social media messages, a message (BLOCK 605). The first server can remove, from the message, one or more words that match a predetermined set of stop words (BLOCK 610). The first server replaces one or more character strings included in the message that are associated with stem words with the corresponding stem word (BLOCK 615). The first server determines a frequency of each of the words included in the modified message (BLOCK 620). The first server determines, using a probabilistic engine executing on the first server, a relevancy score of the modified message indicating a level of relevance between the message and the first category based on the determined frequency of each of the words (BLOCK 625). The first server, responsive to determining that the relevancy score satisfies a threshold, can categorize the message under the first category (BLOCK 630).

In further detail, the first server can receive, from a second server maintaining a plurality of social media messages, a message (BLOCK 605). The server can be a server of a message categorization system. The server can be configured to categorize messages for a user, such as a client, that may wish to generate a response to the messages. For instance, the message can be a message of a person indicating that they are hungry and craving pizza. A pizza company may choose to respond to the person's message by offering a coupon or other incentive. By categorizing messages received via social media sites, the server can present relevant messages to the user (the pizza company) in an automated, timely manner such that the user can use the message to increase sales, awareness, among others.

The first server can receive a plurality of messages in response to a request from a user. The user can include one or more message selection parameters according to which messages on the social media site can be identified and selected. The selected messages that satisfy the message selection parameters included in the request can then be categorized by the message categorization system to facilitate marketing efforts of the user. In some implementations, the selected messages that satisfy the message selection parameters included in the request can then be categorized by the message categorization system for various other reasons.

If the user has a training model that is already established, the server can automatically categorize the message. However, if the user does not have an existing training model established, the messages received by the server for the user can be provided to the user to categorize manually. The manual categorization of messages can then be analyzed by the server to generate the training model.

In some implementations, the message selection parameters can include one or more keywords and a geographic location identifier. The messages retrieved from the social media sites can each include at least one of the one or more keywords and be from a person that is associated with the particular geographic location identifier. The person may either declare that the person is within the geographic location identifier or the location from which the person generated the message is within the particular geographic location. In some implementations, the plurality of messages maintained on the first server include real-time messages not exceeding a predetermined character length. In some implementations, the first server can receive network packets from servers of the social media websites or mobile apps that include the messages.

The messages received by the first server can be redacted or otherwise modified to not include one or more items of information that the server of the social media website does not want to share with the system. For instance, the message received by the first server can be modified to not include any information identifying a particular user, for instance, the user generating the message or one or more user identifiers to which the message is addressed or to user identifiers tagged in the message. In some implementations, the messages can be modified to not include links or other types of data, for instance, icons, emoticons, among others.

The first server can remove, from the message, one or more words that match a predetermined set of stop words (BLOCK 610). The first server can be configured to preprocess each of the messages received. The first server may preprocess a message by parsing the message and removing one or more links, icons, emoticons, among others. The first server may also identify various permutations of the characters included in the message to identify one or more character strings. In some implementations, the server can apply one or more character string identification rules to identify character strings. The server may identify one or more special characters included in the message. For instance, the server can identify a # (hash), which can be indicative of a hashtag. A series of characters that append to a # may form a hashtag. In some implementations, a hashtag can be treated differently than other character strings identified in the message.

The server can identify one or more words in the message. The server can identify words by identifying a sequence of alphabets and matching the sequence of alphabets with a predetermined list of character strings, for instance, a list of character strings included in a database, such as a dictionary. In some implementations, the server can identify non-words (such as links) and remove them from messages. Further, the server can identify words that are prepended or appended by special characters. These words are either removed or the special characters (such as #, @, RT, FWD, among others) are stripped away. Special characters can include non-alpha characters as well as other character sequences (for example, RT (retweet), FWD (forward)) that are automatically inserted in the message based on actions taken by people generating social media messages.

In some implementations, the server can be configured to identify misspelt words. The misspelt words can include words containing typographical errors, acronyms, or other words commonly used to represent particular words. The server can replace the identified misspelt words with correctly spelt words.

The server can identify one or more words included in the message that match words in a stop word list. A stop word can include words that can be removed from the message. In some implementations, stop words may include words that are not considered by the server when categorizing words under a particular category. Examples of stop words can include conjunctions, prepositions, pronouns, some verbs, adverbs, among others. In some implementations, the list of stop words may vary based on the categories within which to categorized messages. In some implementations, if the messages are to be categorized into a first category corresponding to messages that are relevant to a particular advertiser or a second category corresponding to messages not relevant to the advertiser, the stop words may be received from the advertiser or may be selected based on an industry of the advertiser. When parsing the message, the server can modify the message by identifying stop words included in the message and removing the stop words from the message. The server can generate a copy of the received message and remove stop words from the copy of the received message. In some implementations, the server can replace misspelt words with correctly spelt words as well.

The first server replaces one or more character strings included in the message that are associated with stem words with the corresponding stem word (BLOCK 615). The server can identify, from the message, one or more words that correspond to stem words. In some implementations, the words that correspond to stem words may include words including gerunds, a plural form of the stem word, a past, present or future tense of the word, among others. For example, the words "running," "ran," and "runs" may all be identified as words that correspond to the stem word "run." The server can determine, from each of the identified word in the message, whether the word has a corresponding stem word and responsive to determining that the word has a corresponding stem word, replacing the word with the stem word.

The first server determines a frequency of each of the words included in the modified message (BLOCK 620). The server can determine a frequency of each of the words included in the message. In some implementations, the server may determine a frequency of each of the words included in the message after the stop words have been removed, misspelt words have been replaced and words corresponding to stem words have been replaced with the corresponding stem words. The server can store, for each message, a table identifying each of the words and a number corresponding to a frequency of the word. This table can be used to train a probabilistic engine of the server to categorize the received messages.

The first server determines, using a probabilistic engine executing on the first server, a relevancy score of the modified message indicating a level of relevance between the message and the first category based on the determined frequency of each of the words (BLOCK 625). The probabilistic engine can use training data including a first list of messages including a predetermined number of messages previously categorized under the first category and a second list of messages previously categorized under the second category. The second list of messages can include the same predetermined number of messages as the first list of messages. The messages in the first list of messages or the messages in the second list of messages can include one or more of the stem words.

In some implementations, each message of the first list of messages includes at least one stem word included in a first set of stem words and each message of the second list of messages includes at least one stem word included in a second set of stem words. For example, messages that include the stem word 'love' may be categorized under a first category, while messages that include the stem word 'hate' may be categorized under a second category.

In some implementations, the first server can analyze the message to determine an intent of the message. The first server can determine the intent of the message based on the messages in the first list of messages and the second list of messages. As the training model used by the probabilistic engine of the server relies on categorization of messages by the user, the user may be able to identify the intent of a particular message. Using the messages and their corresponding categorizations, the training model too can determine the intent of messages using the information included in the training model. The intent can be derived from a frequency at which certain words are used, or not used, as well as an arrangement of words relative to one another. For instance, a message including the phrase "don't love" includes the word "love" but may alter the categorization of the message based on the position of the word "don't" relative to the word "love." The training model can include one or more rules regarding the position of stem words relative to negative or positive words, among others.

In some implementations, the first server can determine that the intent of the message includes an intent to purchase a product or service identified by the message and responsive to determining that the intent of the message includes an intent to purchase a product or service identified by the message, the first server can categorize the first message under the first category. In some implementations, each message included in the first list of messages are selected responsive to determining that the message is relevant to one or more keywords. In some implementations, the server can include determining, from the message, an intent score indicating a level of intent to purchase a particular product or service.

The first server, responsive to determining that the relevancy score satisfies a threshold, can categorize the message under the first category (BLOCK 630). In some implementations, the threshold can be adjusted to improve the quality of the categorization. In some implementations, the user can confirm that the categorization determined by the system is correct.

In some implementations, the system can shorten the training data set. For example, if 500 is the determined number of messages to include in the first list of messages and the second list of messages, the first list of messages and the second list of messages can be shortened to some number less than 500, such as 400. Second, the frequency counts of words are recalculated from this now trimmed set of training data. Thus, data collected in the training data record set is continually shortened and regrown; therefore, the training data moves over time and better reflects the most recent word usage when categorizing messages.

In some implementations, the message includes a first message. In some such implementations, responsive to categorizing the message under the first category, the first server selects a content item suitable to include in a second message and transmits the second message including the content item to the second server to provide, for display, on a computing device at which the first message was originated. In some implementations, the content item includes one of a coupon, a code, a link or an offer to purchase a product or service identified by one or more words included in the first message.

In some implementations, the first server can identify an entity for which to categorize the plurality of messages, determine, based on the identified entity, one or more keywords related to the entity, select a first category based on the determined keywords and identify, for the selected first category, a subset of the stem words corresponding to the first category.

While the invention has been particularly shown and described with reference to specific embodiments, it should be understood by those skilled in the art that various changes in form and detail may be made therein without departing from the spirit and scope of the invention described in this disclosure.

What is claimed is:

1. A method of categorizing messages, comprising:
    receiving, by a first server from a second server maintaining a plurality of social media messages, a message, the first server configured to categorize the message under a first category or a second category;
    removing, by the first server, from the message, one or more words that match a predetermined set of stop words;
    replacing, by the first server, one or more character strings included in the message that are associated with stem words with the corresponding stem word;
    determining a frequency of each of the words included in the modified message;
    determining, using a probabilistic engine executing on the first server, a relevancy score of the modified message indicating a level of relevance between the message and the first category based on the determined frequency of each of the words, the probabilistic engine using training data including a first list of messages including a predetermined number of messages previously categorized under the first category and a second list of messages previously categorized under the second category, the second list of messages including the same predetermined number of messages as the first list of messages, the messages in the first list of messages or the messages in the second list of messages including one or more of the stem words; and
    responsive to determining that the relevancy score satisfies a threshold, categorizing the message under the first category.

2. The method of claim 1, further comprising analysing, by the first server, the message to determine an intent of the message, the first server determining the intent of the message based on the messages in the first list of messages and the second list of messages.

3. The method of claim 2, further comprising determining, by the first server, that the intent of the message includes an intent to purchase a product or service identified by the message; and
    responsive to determining that the intent of the message includes an intent to purchase a product or service identified by the message, categorizing, by the first server, the first message under the first category.

4. The method of claim 1, wherein each message included in the first list of messages are selected responsive to determining that the message is relevant to one or more keywords.

5. The method of claim 1, further comprising:
    identifying, by the server, an entity for which to categorize the plurality of messages;
    determining, by the server, based on the identified entity, one or more keywords related to the entity;
    selecting a first category based on the determined keywords; and
    identifying, by the first server, for the selected first category, a subset of the stem words corresponding to the first category.

6. The method of claim 1, wherein each message of the first list of messages includes at least one stem word included in a first set of stem words and each message of the second list of messages includes at least one stem word included in a second set of stem words.

7. The method of claim 1, further comprising receiving, by the first server, the plurality of messages responsive to a query identifying one or more keywords and a geographic location identifier.

8. The method of claim 1, wherein the plurality of messages maintained on the first server include real-time messages not exceeding a predetermined character length.

9. The method of claim 1, wherein determining, using a probabilistic engine executing on the server, a relevancy score of the modified message indicating a level of correlation between the message and the first category based on the determined frequency of each of the stem words includes determining, from the message, an intent score indicating a level of intent to purchase a particular product or service.

10. The method of claim 1, wherein the message includes a first message and further comprising:
    responsive to categorizing the message under the first category, selecting, by the first server, a content item suitable to include in a second message; and
    transmitting, by the first server, the second message including the content item to the second server to provide, for display, on a computing device at which the first message was originated.

11. The method of claim 1, wherein the content item includes one of a coupon, a code, a link or an offer to purchase a product or service identified by one or more words included in the first message.

12. A system of categorizing messages, comprising:
    a first server configured to communicate with a second server maintaining a plurality of social media messages, the first server further configured to
    identify a plurality of social media messages;
    remove, for each message of the plurality of social media messages, from the message, one or more words that match a predetermined set of stop words;
    replace, for each message of the plurality of social media messages, one or more character strings included in the message that are associated with stem words with the corresponding stem word;
    determine, for each message of the plurality of social media messages, a frequency of each of the words included in the modified message;
    determine, for each message of the plurality of social media messages, using a probabilistic engine executing on the first server, a relevancy score of the modified message indicating a level of relevance between the message and the first category based on the determined frequency of each of the words, the probabilistic engine using training data including a first list of messages including a predetermined number of messages previously categorized under the first category and a second list of messages previously categorized under the second category, the second list of messages including the same predetermined number of messages as the first list of messages, the messages in the first list of messages or the messages in the second list of messages including one or more of the stem words; and categorize, from the plurality of social media messages, one or more messages under the first category responsive to determining that the relevancy scores of the one or more messages satisfies a threshold; and sort the one or more messages under the first category in one of a chronological order or a reverse chronological order based on timestamps corresponding to when the message was received by the second server.

13. The system of claim 12, wherein the first server is further configured to analyze the message to determine an intent of the message based on the messages in the first list of messages and the second list of messages.

14. The system of claim 13, wherein the first server is further configured to:
   determine, for at least one message of the plurality of messages, that the intent of the message includes an intent to purchase a product or service identified by the message; and
   responsive to determining that the intent of the message includes an intent to purchase a product or service identified by the message, categorize the message under the first category.

15. The system of claim 12, wherein the first server is further configured to:
   identify an entity for which to categorize the plurality of messages;
   determine, based on the identified entity, one or more keywords related to the entity;
   select a first category based on the determined keywords; and
   identify, for the selected first category, a subset of the stem words corresponding to the first category.

16. The system of claim 12, wherein each message of the first list of messages includes at least one stem word included in a first set of stem words and each message of the second list of messages includes at least one stem word included in a second set of stem words.

17. The system of claim 12, wherein the first server is further configured to receive the plurality of messages responsive to a query identifying one or more keywords and a geographic location identifier.

18. The system of claim 12, wherein the first server is configured to:
   responsive to categorizing a first message under the first category, select a content item suitable to include in a second message responsive to the first message; and
   transmit the second message including the content item to the second server to provide, for display, on a computing device at which the first message was originated.

19. The system of claim 18, wherein the content item includes one of a coupon, a code, a link or an offer to purchase a product or service identified by one or more words included in the first message.

20. The system of claim 12, wherein each message included in the first list of messages are selected responsive to determining that the message is relevant to one or more keywords.

* * * * *